2 Sheets. Sheet 1.
I. D. C. Carpenter,
Resawing Machine.
Nº 22,546. Patented Jan. 11, 1859.
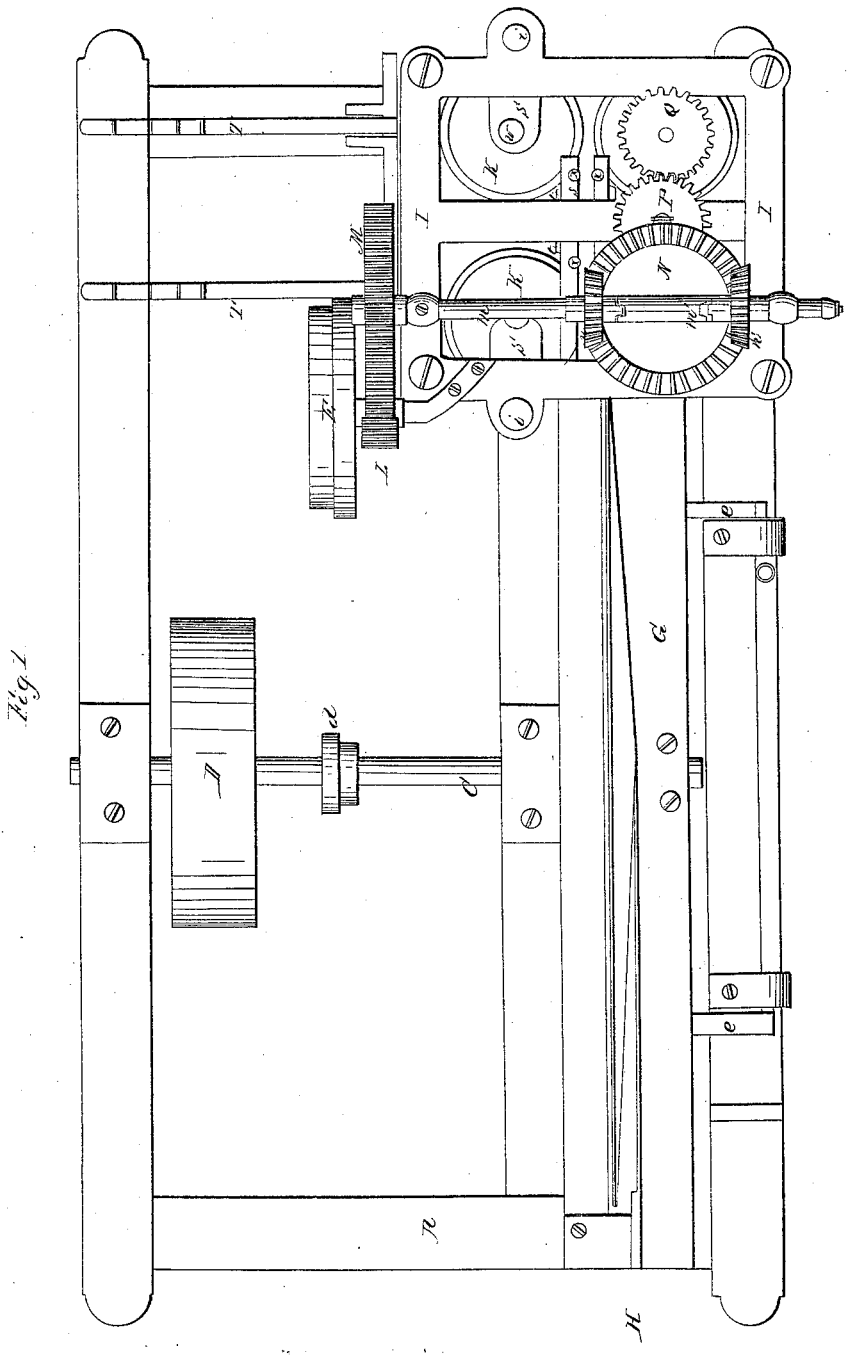

I. D. C. Carpenter,
Resawing Machine.
N°22,546. Patented Jan. 11, 1859.
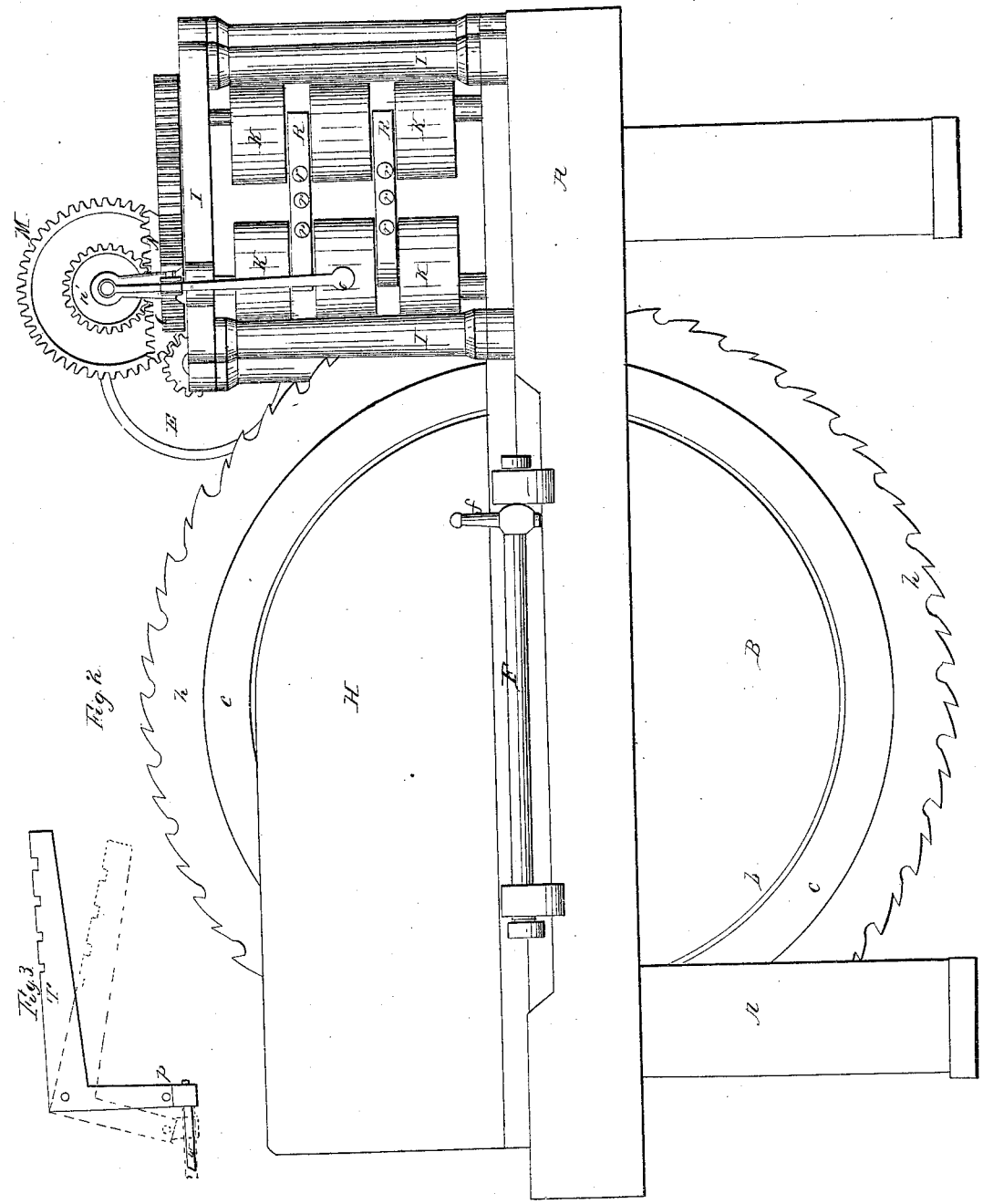

UNITED STATES PATENT OFFICE.

J. D. C. CARPENTER, OF CINCINNATI, OHIO.

DEVICE FOR SETTING LATERALLY CIRCULAR SAWS.

Specification of Letters Patent No. 22,546, dated January 11, 1859.

*To all whom it may concern:*

Be it known that I, J. D. C. CARPENTER, of Cincinnati, in the county of Hamilton and State of Ohio, have invented new and useful Improvements in Circular Saws; and I do hereby declare that the following is a full, and exact description thereof, reference being had to the accompanying drawings and to the letters of reference marked thereon.

My invention consists in the use of two cranks, or a rock shaft acting as an eccentric for moving or setting the saw-shaft and saw laterally.

In the accompanying drawings, A, represents the frame, which may be of any suitable form. The saw B, is supported by the shaft C, carrying two band pulleys, D and $d$. Over the pulley D passes the band which gives motion to the saw. From the pulley $d$, passes another band to the wheel E, to set in motion the feed rollers, hereinafter described. The saw-shaft C, is capable of moving endwise, so as to adjust the saw to the right or left at pleasure. This adjustment is effected by means of the rock shaft F, to which the arms $e$, are attached by a pin placed some distance from the center of the end of the rock shaft, so as to form an eccentric. These arms $e$, are also attached to the bar G, which slides backward and forward upon the frame A, carrying the saw shaft C and also the spreader H. In order to adjust the saw, it is only necessary to turn the rock shaft F, by means of the lever $f$. By this arrangement the saw can be adjusted with facility and accuracy, and yet as soon as the hand is removed and the saw commences cutting, the saw shaft is left free, in order to prevent the saw from cramping or leaving its proper course.

The usual screw-adjustment is slower than mine and is also objectionable because it fixes the saw laterally. The lever adjustment is convenient for moving the saw a great distance, but it does not afford so quick and easy adjustment when the distance is small and great accuracy is required, as in sawing veneers. With my rock-shaft and eccentric the saw may be moved either a small or a great distance with perfect accuracy and facility, thus combining the advantages of both the old methods, and being superior to either of them.

In front of the saw is a frame I for supporting the feed rollers and gearing. The feed rollers are arranged in four series of three each. Two of these series are seen in Fig. 2, at K, and the upper rollers of the corresponding series are seen at K, Fig. 1. The two series seen in Fig. 2, have a positive motion. This motion is communicated in the following manner. The cog wheel E is set in motion by a band passing over said wheel, and also over the pulley $d$; on the shaft of wheel E is a pinion L which transmits the motion to the cog wheel M. Upon the shaft $m$, of wheel M, are two bevel cog wheels $n$, $n'$, through which the motion is transmitted to wheel N, on the shaft or axle of the left hand series of feed rollers K, Fig. 2; then by means of the three pinions, O, P, Q, Fig. 2, the motion is communicated to the right hand series of feed rollers, K, Fig. 2.

The axle or shaft $m$, is divided, and the two ends slide into the sheath $m'$, which, having notches in its ends, serves also as a lock to make the two ends turn together. This lock, and also the cog wheel $n'$, can be withdrawn by the lever $o$, and thus the cog wheels, $n$, $n'$, can be thrown out of gear at pleasure, so as to stop the motion of the feed rollers K, without stopping the rest of the machine.

Between the rollers K, Fig. 2, are two bars R, the ends of which are supported on the axles or shafts of the rollers K. In Fig. 1, is seen a bar $s$, situated above the upper roller K. Directly under this bar $s$ are three other similar bars, two of which are in front of the bars R, and the third is below the lower roller K. These four bars $s$, are connected by the upright bar $t$, and they are supported by set screws $r$, passing through the bars R, and entering two of the bars $s$. Into the edges of the four bars $s$ are inserted four small friction rollers $x$, extending from the top to the bottom of the feed rollers K, so as to present a convenient bearing surface for steadying the plank without bending it. On the opposite side of the machine are two other sets of feed rollers, K, Fig. 1, and also four corresponding bars $s$, and four rollers $x$. These rollers K, Fig. 1, revolve independently upon stationary axles or shafts $w$, Fig. 1.

The axles or shafts $w$, are connected by hinges S, to the post $i$, so that the rollers K may swing backward and forward, carrying the friction rollers $x$, of that side of the machine. After the plank is placed between the two sets of friction rollers $x$, the movable feed rollers K, Fig. 1, and their friction rollers $x$, are pressed against the plank by means of the weighted elbow levers T, Fig. 1.

The elbow levers T are better seen in Fig. 3. They have a joint $p$, below which they are connected with a rod $w$, which extends to the series of rollers K. By this arrangement, when the long arm of the lever T is depressed, as shown in red lines, Fig. 3, the short arm advances and the joint $p$, bends so that the rod $w$, may move forward, thrusting the rollers K, before it without tending to elevate them. This flexible weighted elbow lever T in this manner swings the series of rollers K, forward upon the hinges S, with great ease and accuracy. This arrangement for holding the plank or other stuff in place by the system of rollers swinging on hinges S, and operated by jointed levers T, is found in practice to be a great improvement.

Having thus fully described my invention what I claim and desire to secure by Letters Patent of the United States is:

The rock shaft F, connected with arms $e$, and acting as an eccentric or as two cranks for adjusting the saw-shaft laterally substantially as set forth.

J. D. C. CARPENTER.

In presence of—
A. B. WAMBAUGH,
HARRY Z. WARREN.